Patented May 10, 1932

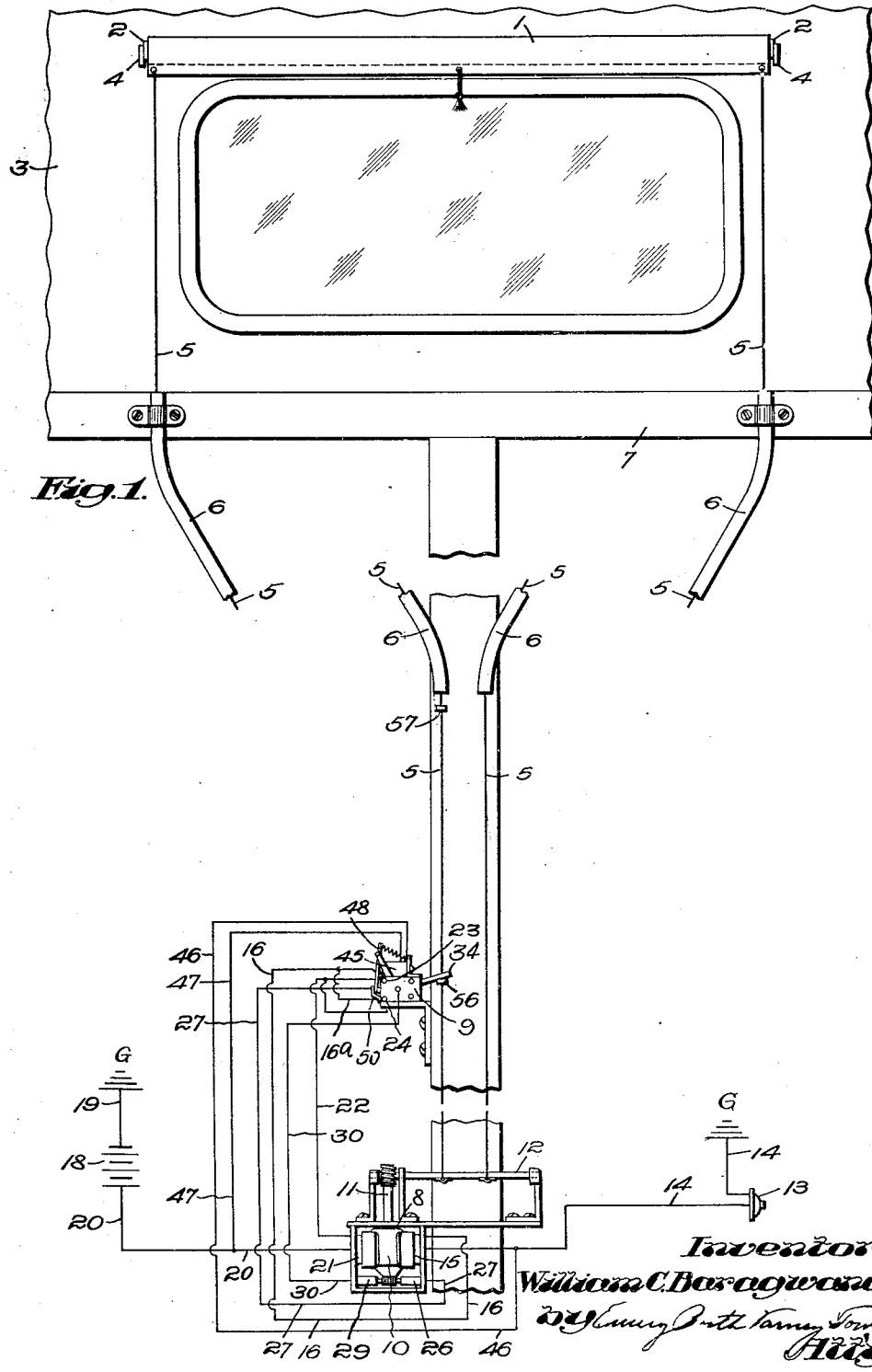

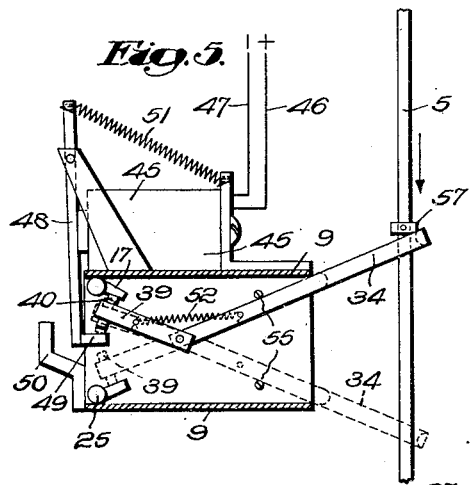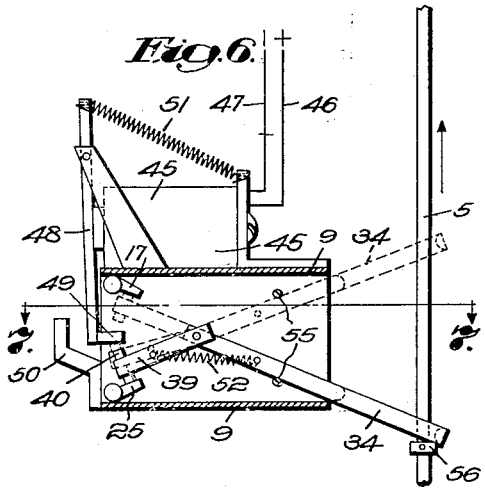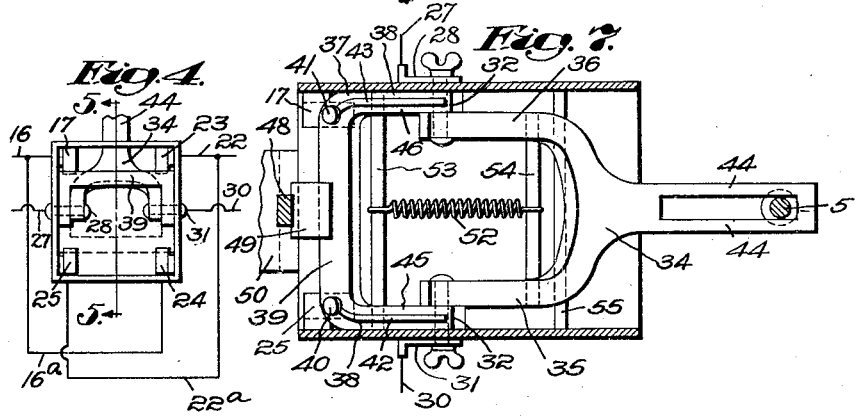

1,857,682

UNITED STATES PATENT OFFICE

WILLIAM C. BARAGWANATH, OF LEXINGTON, MASSACHUSETTS

CURTAIN CONTROL

Application filed May 8, 1930. Serial No. 450,768.

This invention relates generally to automobiles and particularly to curtain operating means for closed cars, and it aims to provide a novel and improved means for raising and lowering the rear curtain at will, from any point, preferably the front seat.

In the drawings of one embodiment of my invention illustrated and described herein, Fig. 1 is a partial interior, rear end view, broken away for convenience, of an automobile body with its curtain raised, and with it a diagrammatic arrangement of elements comprising my novel raising and lowering means;

Fig. 2, a detail on an enlarged scale of the motor drive connection with the curtain cord winder;

Fig. 3, a vertical section on the line 3—3, Fig. 2;

Fig. 4, an end detail view of the switch box of the control from the left, Fig. 1, with the box end and adjacent parts removed, and showing the electric circuits diagrammatically;

Fig. 5, a vertical section on the line 5—5, Fig. 4, from the right, through the switch box, showing the movable switch member and tripping member therefor in full lines in normal position, when the curtain is raised;

Fig. 6, a similar view of the same parts when the curtain is lowered;

Fig. 7 a horizontal section, partly broken away, on an enlarged scale on the line 7—7, Fig. 6, looking down.

Referring first to Fig. 1, my novel construction is shown as comprising a usual curtain 1, on a roller 2, with no ratchet means for holding the curtain in a given position, and secured to the back 3 of a car, by means of usual fixtures 4.

The curtain is provided at its lower end with one or more, herein two, cords 5 for operating it, and which lead downwardly behind the upholstered back of the rear sheet, the latter not shown, into tubes or ducts 6, secured to any convenient part of the body, as the upholstery rail 7. Adjacent the ends of the tubes and behind the seat back are positioned, in any convenient manner, the motor 8 and switch box 9, and operating connections, which will be described. There is ample room in the average car behind the upholstered back for these elements.

The motor, Figs. 2, 3, is of suitable capacity, say one-twentieth horsepower, with two fields, the armature 10 of which carries a worm shaft 11 meshing with a cooperating curtain-cord winding drum 12. From an operating switch, as a push button 13, Fig. 1, located at any convenient point for the driver, leads a positive wire 14 to the ground G, as the chassis, and to one field 15. From this field runs the negative wire 16 to the terminal 17 on the back of the switch box 9, as shown in Fig. 1, see Figs. 4, 5 and 6.

From any current producing source as the battery 18 of the car, Fig. 1, runs from one terminal a positive line 19 to the ground G, and from the opposite battery terminal runs a negative line 20 to the opposite motor field 21, from which runs the positive line 22 to the terminal 23, Figs. 1, 4, on the switch box 9. The line 16, Figs. 1, 4, has a branch 16$^a$ which runs to the terminal 24 on the opposite side of the box and diagonally across from terminal 17. The line 22, Fig. 4, also branches and runs as 22$^a$ diagonally across the switch box to the terminal 25.

From the brush 26 of the motor Figs. 1, 2, a line 27 runs to the central terminal 28 on the back of the switch box 9, see also Fig. 4, and from the opposite brush 29 runs a wire 30 to the opposite terminal 31 on the front of the switch box, Fig. 1, also see Fig. 4.

On the front and back walls of the switch box 9, Fig. 7, are pivot studs 32, to which the terminals 31, 28 are connected, suitably insulated, and on these studs is movably secured a switch tripping lever 34, forked to provide arms 35, 36, see also Fig. 4.

Pivoted to these same studs 32, Fig. 7, and between the arms 35, 36 and the box walls are the arms 37, 38 of a U-shaped switch member 39. These arms 37, 38 are of any suitable insulating material as fiber, and on the arm connecting portion are contacts 40, 41, extended through the same, and protruding on opposite sides, and from these contacts extend, on one side of the member 39 and along the arms 37, 38 connecting strips 42, 43 in each case, to the studs 32, and terminals 28, 31.

The lever 34, Fig. 1, extends outwardly through the inner end of the box 9 and its end is slotted to provide the bars 44 between which is received one cord 5 running to the shaft 12, Fig. 1.

On the switch box 9, Figs. 1, 5, 6, is an electromagnet 45 to the opposite terminals of which run lines 46, 47 from the lines 14, 20 respectively. In operative relation to this magnet, Figs. 1, 5, 6, is mounted an armature 48 with an insulated detent 49 inwardly extended therefrom into the path of the swinging switch member 39. A stop member 50 is provided to restrain undue outward movement of the armature 48. The armature is normally held out of contact with the magnet 45 by the spring 51.

A spring 52, Fig. 7, extends between the rod 53 on the member 39 and the rod 54 on the arms 35, 36, and tends to draw the members 39, 34 toward each other on either side of the pivots 32 so far as permitted by the stops 55 on the sides of the box 9 and the detent 49 according as the member 39 is in contact with one side or the other of the detent.

One cord 5, Fig. 1, is provided with a pair of disks 56, 57 in proper positions thereon so that the disk 56 will contact with one side of the member 34 when the curtain is raised and the disk 57 will contact with the opposite side of this member when the curtain is lowered.

If now, with the curtain raised as in Fig. 1, and the members 39, 34 in full line position shown in Fig. 5, the switch 13 is closed by the operator, a circuit will be closed through the line 14, field 15, line 16, terminal 17, line 16ª to terminal 24; and terminal 24, contact 40, strip 42 to terminal 31, and line 30 to one brush 29; and a circuit from battery 18 through line 20 to field 21, line 22 to terminal 23 and line 22ª to terminal 25; and through contact 41, strip 43 to the opposite terminal 28, and line 27 to the opposite brush 26, causing the motor to rotate.

As the motor rotates the cord 5 is wound upon the winding drum 12 and the curtain is lowered. The disk 57 is so located upon the cord 5 as to position, that it will engage the member 34 when the curtain has been lowered to the limit.

When the disk engages the tripping member 34, the latter is, Figs. 4, 5, moved from full line position to dotted line position just beyond the center or pivot 32, so that the spring 52, now positioned on the full line side of pivot 32, is carried to the opposite side and acts to throw the switch 39 forward to dotted line position, against detent 49, but further movement is prevented by the detent 49 which was thrust into the path of member 39 by the energizing of the magnet 45 through the closing of the circuit through the switch 13 and before the switch 39 was tripped by the lever 34. The member 39, therefore, simply moves out of contact with terminals 23, 17 thereby stopping the motor, and engaging the detent 49, dotted line position, Fig. 5. The operator then releases the button 13 which opens the circuit, deenergizes the magnet 45, thus allowing the spring 51 to raise the detent 49, and permitting spring 52 to throw member 39 to dotted line position, Figs. 4, 5, in contact with terminals 24, 25 reversing the switch for future operation.

Thus the circuit for reverse operation of the motor and raising of the curtain is closed through line 14, switch 13, to field 15, line 16 to terminal 17, line 16ª to terminal 24, strip 42 to terminal 31, line 30 to one brush 29; and line 20 to field 21, line 22 to terminal 23, line 22ª to terminal 25 and strip 43 to terminal 28 and line 27 to brush 26, requiring only the closing of the switch 13 to operate the motor in the opposite direction in the manner described, the disk 56 engaging the member 34 on the opposite side when the curtain is to be raised, and stopping the motor as before, at the proper time by contact with the member 34.

If the operator wishes to lower the curtain only part way, he releases the button 13 at the proper time and the motor will stop, holding the curtain in desired position as determined by the position of the disk 57 and without throwing the switch 39.

Thus, to either lower the curtain the remaining distance or raise it, he presses the button and keeps the circuit closed until, when the curtain has been lowered full distance, as described, the motor will stop and he then releases the button 13 as before. He may raise the curtain by again closing the operating switch 13 as before, and the motor will again reverse itself, in due time as described.

My invention provides a novel, efficient means for controlling the position of the curtain at will, and a means that is compact, taking up no space in the car that is required for other purposes, and one that is inexpensive and almost completely hidden from sight.

My invention is not limited to the precise embodiment thereof described and illustrated.

Claims:

1. A window curtain and roller operating means comprising a motor, a source of current therefor, a curtain-cord winding drum operated by the motor, a curtain cord connected thereto and adapted to be operably connected to the roller; switch actuating means on the cord, and a reversible switch controlled by said means in circuit with the motor for operating it and the roller in either direction and a control switch therefor.

2. A window curtain and roller operating means comprising a motor, current producing means connected thereto, a curtain-cord winding drum connected to and operated by the motor, a cord operably connecting the roller and the drum; switch actuating means on the cord, and a reversible motor-operating switch controlled by said means in circuit with the motor, and electromagnetic means for effecting the reversal of the switch, and a control switch therefor.

3. A window curtain and roller operating means comprising a motor, a power connection therefor, a curtain-cord winding drum operated by the motor, a curtain cord adapted to be connected to the curtain roller and drum with switch actuating means thereon, and a reversible motor operating switch in circuit with the motor comprising a plurality of sets of circuit connections, one set operable when the switch is set in either position, and two sets operable each when the switch is set in one position only, and means controlling the manner and time of reversal of the switch after the stopping of the motor, and a control operating switch therefor, the switch having a plurality of pairs of contacts, a tripping member therefor, and a detent operable with the switch through either pair of contacts.

4. A curtain and roller actuating means for a motor vehicle window, comprising a motor, a curtain cord winding member operated thereby, a curtain cord with switch actuating means thereon, a conduit extended from the drum to and adjacent the vehicle window, and a reversible switch in circuit with the motor for operating the motor to raise and lower the curtain and a contolling switch therefor.

In testimony whereof, I have signed my name to this specification.

WILLIAM C. BARAGWANATH.